United States Patent Office 3,459,840
Patented Aug. 5, 1969

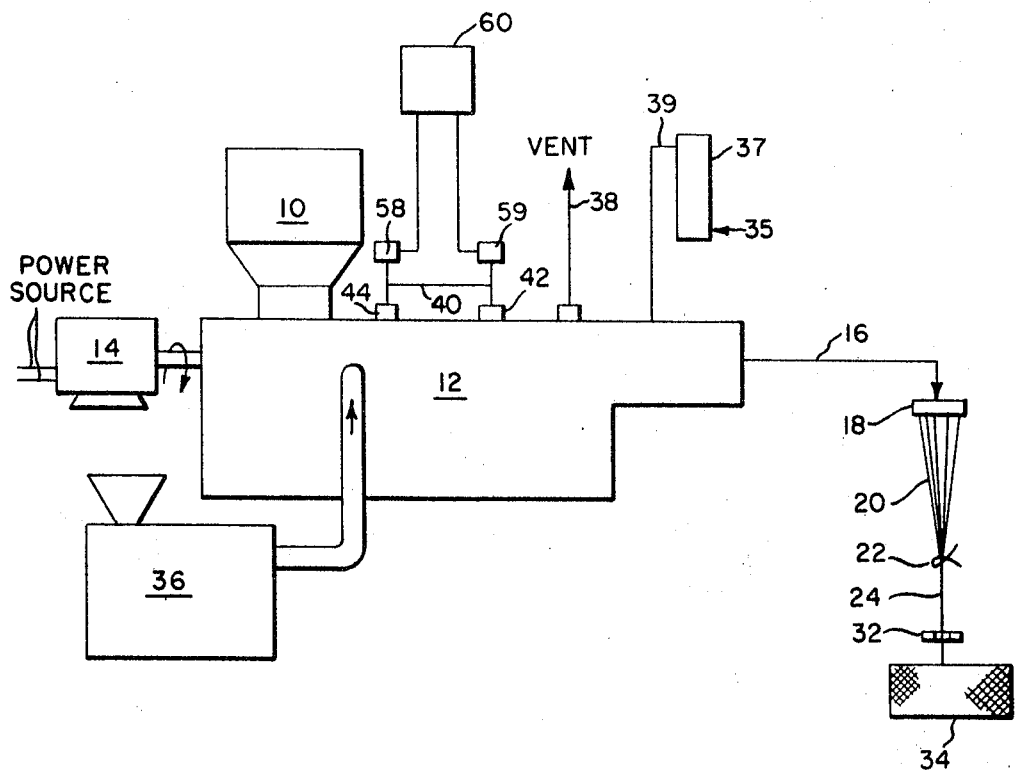

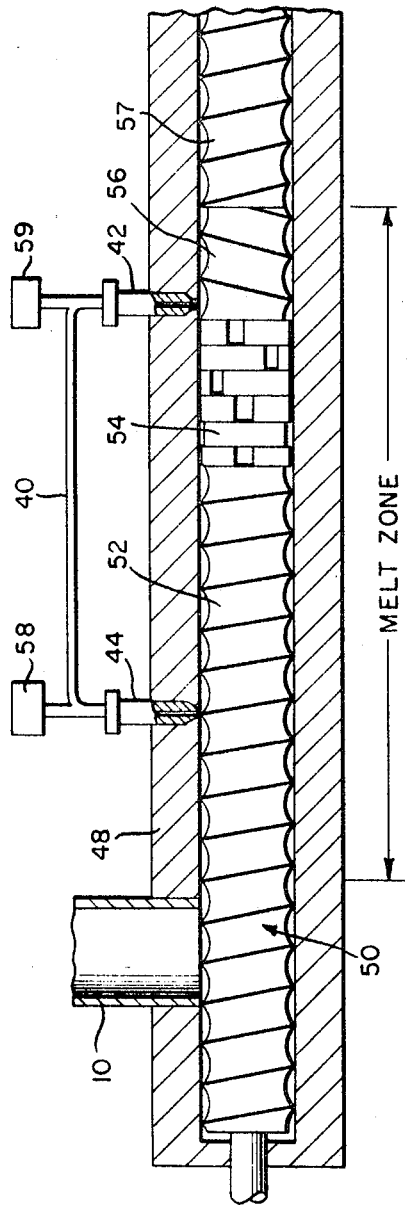
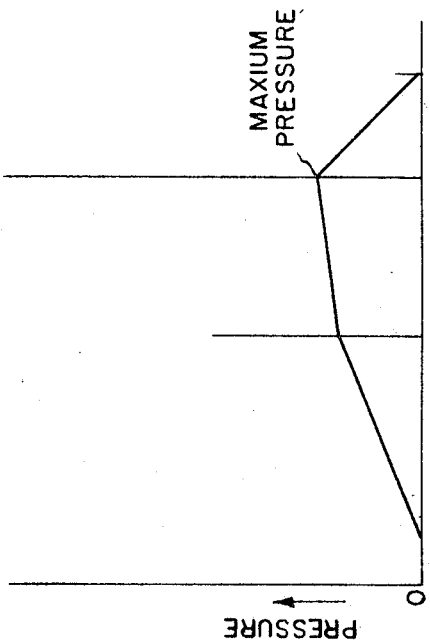

3,459,840
PROCESS FOR MELT EXTRUSION OF
POLYAMIDE MATERIAL
Stanley David Wood, Kingston, Ontario, Canada, assignor, by mesne assignments, to E. I. du Pont de Nemours and Company, Wilmington, Del., a corporation of Delaware
Filed Dec. 21, 1966, Ser. No. 603,524
Int. Cl. B29f 3/06, 3/08; B29b 5/04
U.S. Cl. 264—37          3 Claims

ABSTRACT OF THE DISCLOSURE

A process of the melt extrusion of a polyamide material from a vented screw extruder wherein a portion of the melt is recycled from a high pressure point to a low pressure point in the melt zone of the extruder. The high pressure is built up by restraining the flow of polymer in the melt zone. The extruder is preferably vented at a point beyond the limits of the pressure buildup.

This invention relates to the production of shaped articles by melt extrusion and, more particularly to improvements in and relating to the production of shaped articles by extrusion of polyamide materials.

In the melt-extrusion of shaped articles from thermoplastic materials such as by intermittent injection molding, it is known to recirculate a portion of the melt from the outlet to a mid-point of a screw extruder to provide for continuous operation of the extruder during intervals when injection ceases. However, it is also recognized that when certain thermoplastic materials are used such as polyamides, recirculation is not practical because the resultant increased residence time in the extruder may very well cause thermal degradation and decomposition of the polyamide material.

The present invention contemplates external recirculation of a portion of a polyamide melt from one point to another in the melt zone of a screw extruder without experiencing the negative effects of excessive thermal degradation. The recirculation results in reduced torque requirement for the extruder screw resulting in reduced power input requirements for the motor drive of the extruder.

Therefore, it is an object of this invention to provide a process for the melt extrusion of a polyamide material from a screw extruder wherein a portion of the melt is recirculated from one point to another in the extruder without experiencing excessive thermal degradation of the polyamide material. It is a corollary objective of this invention to provide a process to improve the efficiency of a screw extruder used in the production of shaped articles from polyamide materials.

These and other objectives are accomplished in a process for the production of shaped articles from polyamide material which comprises feeding polyamide flake into a screw extruder as molten polyamide material is moved through the extruder to its outlet; melting the flake while moving it through a melt zone of the extruder; restraining the flow of the molten polyamide material within the melt zone to provide a build-up of pressure in the zone and continuously recycling a portion of the pressurized molten polyamide material to a low pressure point in the melt zone.

The nature and advantages of the process of this invention will be more clearly understood by the following example and drawings in which:

FIGURE 1 is a schematic drawing showing the apparatus suitable for carrying out this invention.

FIGURE 2 is a partial cross-sectioned view of the extruder showing the melt zone.

FIGURE 3 is a graph showing the relative pressure within the melt zone when the extruder is in operation.

Referring to FIGURE 1, a polyamide flake is fed from hopper 10 to extruder 12 where it is melted and mixed and conducted to pipe 16 and then to a spinneret 18 where it is extruded as filaments 20. The filaments are gathered into threadline 24 at guide 22 and may be packaged in a conventional manner such as by winding through a traverse guide 32 to a package 34.

Extruder 12 is a screw extruder adapted for mixing as well as extruding the resulting mixture. Such an apparatus is customarily provided with a plurality of inlet ports and at least one venting port such as 38 and is further characterized by twin screws which intermesh to advance the material from the inlet to the outlet. An electric motor 14 drives the screws. The barrel surrounding the screws has means (not shown) for controlling the temperature of the conveyed material. In addition to polyamide flake, other solid or liquid material such as delustrants, pigments, etc., can be added from a feeder 36 to extrusion device 12 through any suitable inlet therein. Since it is a requisite that the molten polyamide move through an oxygen-free environment, the extruder 12 is provided with suitable means such as vacuum means for removing oxygen and volatiles as well as means for passing inert gas, as for example nitrogen, through the extruder. Vacuum may be applied at vent pipe 38. When a nitrogen sweep is used, the nitrogen is supplied from a source 35 through flow meter 37 and pipe 39 and may be exhausted through vent pipe 38.

Referring now to FIGURE 2 and 3, the melt zone section of the screw 50 contained in barrel 48 includes a right-hand threaded section 52, a kneading section 54 and a left-hand threaded section 56 followed by right-handed section 57 for conveying the molten polymer to the metering zone (not shown) for extrusion. Ports 42 and 44, connected by pipe 40, are located at the high and low presure points respectively within the melt zone. This is best shown by the graph of FIGURE 3 which is scale to FIGURE 2 to show the relative pressure developed between ports 44, 42. In operation, a portion of the molten polymer passing through extruder 12 will recycle from the high pressure point in the melt zone through port 42 and line 40 then back into the melt zone at a low pressure point through port 44. The driving force for the polymer recycle is the pressure developed by the restraining action of left-hand screw section 56 and right-hand screw section 52. Pressure transducers 58 and 59 are tapped in at ports 44 and 42, respectively, with their output being applied to a differential pressure recorder 60 (FIGURE 1) as a means to determine the flow rate of the recycle melt. The rate of recycle is controlled by the differential pressure between ports 42, 44 and the pressure drop through nozzles 42, 44 and pipe 40. Therefore, the location of ports 42, 44 is important from the standpoint of providing a minimum recycle time for the molten polymer to minimize thermal degradation.

Since the volume of molten polymer in the screw channels between the port 42 and 44 is increased due to recycling, the location of the ports with respect to vent or vacuum lines is also of importance. As shown in FIGURE 1, it is desirable to recycle upstream from the vent line 38 so that the volume of polymer in the screw channels below the vent port does not increase and become a potential vent pluggage problem. This becomes particularly important when throughput is increased to a point that the polymer below the vent 38 increases to such a critical level that it may be drawn into the vent.

The principles and practice of the present invention will now be further illustrated by the following example.

Example I

Particulate flake polyhexamethylene adipamide is introduced to an extrusion device similar to that schematically illustrated in FIGURE 1. Both the rate of introduction of flake material and extrusion of molten polymer is maintained at 570 grams/min. at a melt zone temperature of 292° C., the power input to the motor with no recycling is 27 kw. When a portion of the melt is recycled within the melt zone at a rate of 87 grams/min., the power input to the motor drops to 22 kw., or a reduction of 18.5%. The temperature of the melt zone dropped from 292° C. to 290° C. There is no evidence of thermal degradation.

The invention has been described in detail with particular reference to the preferred embodiment; however, the invention is also applicable to single as well as twin screw extruders. It is also contemplated that the extruder may be blanketed with an inert gas sweep or vented downstream as well as upstream of the recycle loop.

What is claimed is:

1. A process for producing shaped articles comprising the steps of:
    (a) feeding polyamide flake into a screw extruder as molten polyamide material is moved through the extruder to its outlet for extrusion into shaped articles, said extruder having a melt zone maintained above the melting point of the flake;
    (b) melting the flake while moving it through the melt zone;
    (c) restraining the flow of the molten polyamide material in the melt zone, said restraining step providing a pressure build-up within the melt zone from a low to a high pressure point; and
    (d) continuously recyling a portion of the pressurized molten polyamide material in a single step from said high pressure point to said low pressure point in the melt zone.

2. The process of claim 1 including the additional steps of maintaining an oxygen free environment in the extruder between the pressurized molten polyamide and the outlet of the extruder and venting said environment outside the limits of said recycling step.

3. The process of claim 1 wherein the polyamide consists essentially of polyhexamethylene adipamide.

References Cited

UNITED STATES PATENTS

| | | |
|---|---|---|
| 2,505,125 | 4/1950 | List. |
| Re. 23,948 | 2/1955 | Fuller. |
| 3,040,005 | 6/1962 | Bernhardt _____ 264—349 X |

ROBERT F. WHITE, Primary Examiner

A. M. SOKAL, Assistant Examiner

U.S. Cl. X.R.

18—12; 264—176